Patented June 22, 1926.

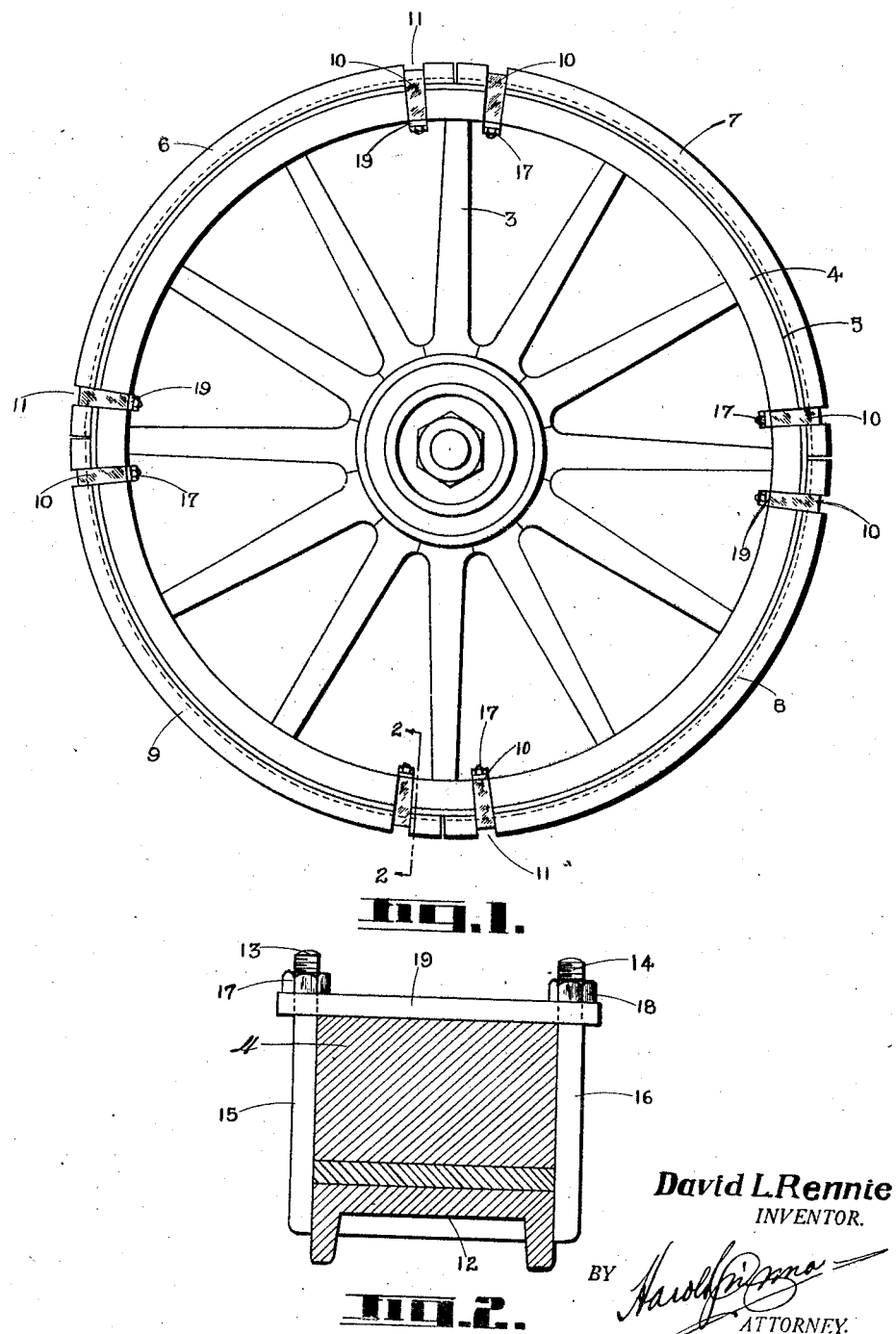

1,589,661

UNITED STATES PATENT OFFICE.

DAVID LEWIS RENNIE, OF PONTRILAS, SASKATCHEWAN, CANADA.

AUXILIARY TIRE FOR VEHICLE WHEELS.

Application filed January 26, 1925. Serial No. 4,678.

The present invention comprehends the provision of an auxiliary tire adapted for attachment to a vehicle wheel to prevent the latter from skidding, particularly during the seasons of the year in which the roads are frozen and slippery.

The invention consists essentially of the novel features pointed out broadly and specifically in the claims for novelty following a description containing an explanation in detail of an acceptable form of the invention.

My invention has for its primary object the provision of an auxiliary tire for a vehicle wheel formed of a plurality of sections which may be attached to, and removed from a wheel with expediency and facility and which when used will serve to prevent the wheel from skidding laterally when travelling over frozen and slippery surfaces.

With the foregoing and other objects in view which will appear more fully as the description proceeds the invention resides in the novel combination and arrangement of co-operating elements as hereinafter more specifically set forth, claimed and shown in the accompanying drawings forming a part of the present application, and in which:

Fig. 1 is a side elevation illustrating the application of my invention to a conventional vehicle wheel, and Fig. 2 is an enlarged sectional view as it would appear when taken on the plane indicated by the line 2—2 on Fig. 1.

The term "wheel" hereinafter used is intended to include a vehicle or implement wheel or the equivalent with which my invention may be associated without alteration in the physical construction thereof.

In the annexed drawings the numeral 3 designates a wheel in its entirety, provided with the usual wooden felly 4 and metallic rim 5.

My invention consists of a plurality of segmental sections formed of a standard channel shape, indicated at 6, 7, 8, and 9.

As shown, the said sections are shaped in the form of segments and are secured to the felly 4 of the wheel in abutting relation, the ends thereof being secured to said felly by the clamps generally indicated at 10 in Fig. 1. The flanges of said sections are cut away as at 11 to receive transverse portions 12 of said clamps which bear flat against the webs of said sections. The inner extremities 13 and 14 of the sides 15 and 16 of said clamps are screw-threaded to receive the nuts 17 and 18 which serve to lock the members 19 in position against the inner periphery of the felly 4.

From the foregoing it is apparent that I have provided an auxiliary tire for vehicle wheels which may be manufactured at a moderate cost; which may be mounted upon and removed from a wheel in a short period of time without special facilities and which will be effective and very durable in use.

While I have illustrated and described the preferred embodiment of my invention I desire to have it understood that minor changes in the details of construction may be resorted to without departing from the spirit of the invention as defined by the annexed claims.

What I claim as new is:

1. The combination with a wheel including a felly and rim of an auxiliary tire formed of a plurality of segmental sections channel-shaped in cross section, the ends of which abut; a clamp straddling each of said segmental sections in close proximity to the abutting ends thereof seated inwardly of the outside peripheries of said segmental sections; and means for detachably connecting said clamps to said felly.

2. The combination with a vehicle wheel including a rim, of an auxiliary tire including segmental sections channel-shaped in cross section arranged about said rim in abutting relation; clamps seated in said sections in close proximity to the abutting ends thereof; screw threaded extremities on said clamps extending inwardly beyond the inner periphery of said rim, members positioned over said threaded extremities and extending transversely of said rim to hold said threaded extremities in position; and nuts on said threaded extremities for securing said members.

In testimony whereof, I affix my signature.

DAVID LEWIS RENNIE.